United States Patent
Lin et al.

(10) Patent No.: US 11,249,314 B1
(45) Date of Patent: Feb. 15, 2022

(54) METHOD FOR SWITCHING INPUT DEVICES, HEAD-MOUNTED DISPLAY AND COMPUTER READABLE STORAGE MEDIUM

(71) Applicant: HTC Corporation, Taoyuan (TW)

(72) Inventors: Sheng-Cherng Lin, Taoyuan (TW); Chien-Hsin Liu, Taoyuan (TW); Shih-Lung Lin, Taoyuan (TW)

(73) Assignee: HTC Corporation, Taoyuan (TW)

( * ) Notice: Subject to any disclaimer, the term of this patent is extended or adjusted under 35 U.S.C. 154(b) by 10 days.

(21) Appl. No.: 16/984,164

(22) Filed: Aug. 4, 2020

(51) Int. Cl.
| | | |
|---|---|---|
| *G02B 27/00* | (2006.01) | |
| *G02B 27/01* | (2006.01) | |
| *G06F 3/01* | (2006.01) | |
| *G06T 19/00* | (2011.01) | |
| *G06K 9/00* | (2022.01) | |

(52) U.S. Cl.
CPC ..... *G02B 27/0172* (2013.01); *G02B 27/0179* (2013.01); *G06F 3/011* (2013.01); *G06K 9/00355* (2013.01); *G06T 19/006* (2013.01); *G02B 2027/0185* (2013.01)

(58) Field of Classification Search
None
See application file for complete search history.

(56) References Cited

U.S. PATENT DOCUMENTS

| | | | | |
|---|---|---|---|---|
| 10,778,953 B2 * | 9/2020 | Lin | ...................... | H04N 13/117 |
| 11,076,144 B2 * | 7/2021 | Luo | .................... | G06K 9/00597 |
| 2018/0348860 A1 * | 12/2018 | Lin | ...................... | G06K 9/0061 |

* cited by examiner

*Primary Examiner* — Martin Mushambo
(74) *Attorney, Agent, or Firm* — JCIPRNET

(57) ABSTRACT

The disclosure provides a method for switching input devices, a head-mounted display (HMD) and a computer readable storage medium. The method includes: providing a visual content, wherein a first physical input device is visible in the visual content; determining whether a first specific distance between a specific object and the first physical input device is smaller than a first threshold; enabling the first physical input device in response to determining that the first specific distance is smaller than the first threshold; disabling the first physical input device in response to determining that the first specific distance is not smaller than the first threshold.

20 Claims, 4 Drawing Sheets

METHOD FOR SWITCHING INPUT DEVICES, HEAD-MOUNTED DISPLAY AND COMPUTER READABLE STORAGE MEDIUM

BACKGROUND OF THE INVENTION

1. Field of the Invention

The present disclosure generally relates to mechanisms for controlling input devices, in particular, to a method for switching input devices, a head-mounted display (HMD) and a computer readable storage medium.

2. Description of Related Art

Along with the development of mixed reality (MR) technologies, current HMDs are capable of for reality access. For optical see through or video pass through reality experiences, hand gestures are the main input method because most virtual contents are an extension of real objects in space.

To interact with these contents, it makes sense for users to come in proximity of these real-world objects and reach out with their hands as means to control. In full virtual immersive state, hand gestures are limited to simple operations that respects the physics of our real world, yet for example, the distance operation of movie dashboard browsing is still preferred by additional physical controllers. Complex gesture language can be designed for such scenarios but it requires a lot of machine learning and high user learning curve. Even with all the language learned, the tactile feedback and control accuracy of real controllers cannot be replicated.

Current switch between hand tracking and virtual 6 degree of freedom (6dof) controllers happens at the start of a virtual app. Users can manually switch in the menu layer if hand gesture is preferred. However, when MR contents starts to be mature, the switch between hand gesture, virtual controller, and even 2D virtual input controllers (such as keyboard and mouse) will be more frequent and expected to be accessible at the same time.

Therefore, it is crucial to design an intuitive way to switch between these different input devices.

SUMMARY OF THE INVENTION

Accordingly, the present disclosure is directed to a method for switching input devices, an HMD and a computer readable storage medium.

The disclosure provides a method for switching input devices, adapted to a head-mounted display (HMD). The method includes: providing a visual content, wherein a first physical input device is visible in the visual content; determining whether a first specific distance between a specific object and the first physical input device is smaller than a first threshold; enabling the first physical input device in response to determining that the first specific distance is smaller than the first threshold; disabling the first physical input device in response to determining that the first specific distance is not smaller than the first threshold.

The disclosure provides a computer readable storage medium, recording an executable computer program to be loaded by a head-mounted display (HMD) to execute steps of: providing a visual content, wherein a first physical input device is visible in the visual content; determining whether a first specific distance between a specific object and the first physical input device is smaller than a first threshold; enabling the first physical input device in response to determining that the first specific distance is smaller than the first threshold; disabling the first physical input device in response to determining that the first specific distance is not smaller than the first threshold.

The disclosure provides a head-mounted display (HMD) including a display, a storage circuit, and a processor. The storage circuit stores a plurality of modules. The processor is coupled to the display and the storage circuit and accesses the modules to perform following steps: controlling the display to provide a visual content, wherein a first physical input device is visible in the visual content; determining whether a first specific distance between a specific object and the first physical input device is smaller than a first threshold; enabling the first physical input device in response to determining that the first specific distance is smaller than the first threshold; disabling the first physical input device in response to determining that the first specific distance is not smaller than the first threshold.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1:
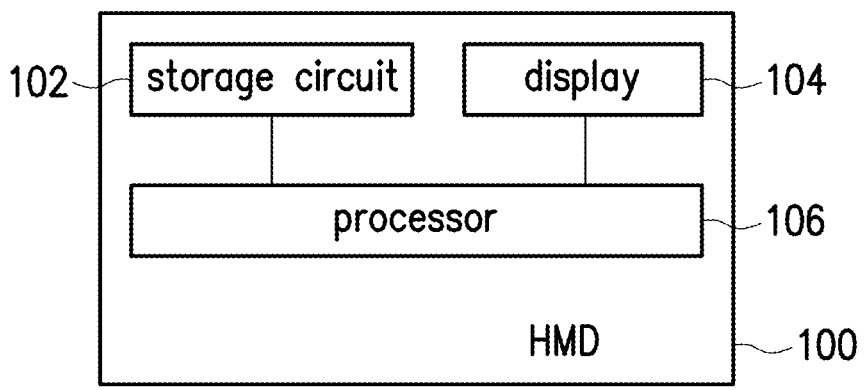
FIG. 1 shows a schematic diagram of an HMD according to an embodiment of the disclosure.

Reference will now be made in detail to the present preferred embodiments of the disclosure, examples of which are illustrated in the accompanying drawings. Wherever possible, the same reference numbers are used in the drawings and the description to refer to the same or like parts.

See FIG. 1, which shows a schematic diagram of an HMD according to an embodiment of the disclosure. In FIG. 1, the HMD 100 includes a storage circuit 102, a display 104, and a processor 106.

The storage circuit 102 is one or a combination of a stationary or mobile random access memory (RAM), read-only memory (ROM), flash memory, hard disk, or any other similar device, and which records a plurality of modules that can be executed by the processor 106.

In the embodiments of the disclosure, the display 104 may be an optical see through display. That is, the visual content shown in the display 104 may include virtual contents and physical contents, wherein the virtual contents may include virtual reality contents, and the physical contents may include real world objects in front of the HMD 100, but the disclosure is not limited thereto.

The processor 106 may be coupled with the storage circuit 102 and the display 104, and the processor 106 may be, for example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, an ARM-based processor, and the like.

In the embodiments of the disclosure, the processor 106 may access the modules stored in the storage circuit 102 to implement the method for switching input devices provided in the disclosure, which would be further discussed in the following.

Figure 2:
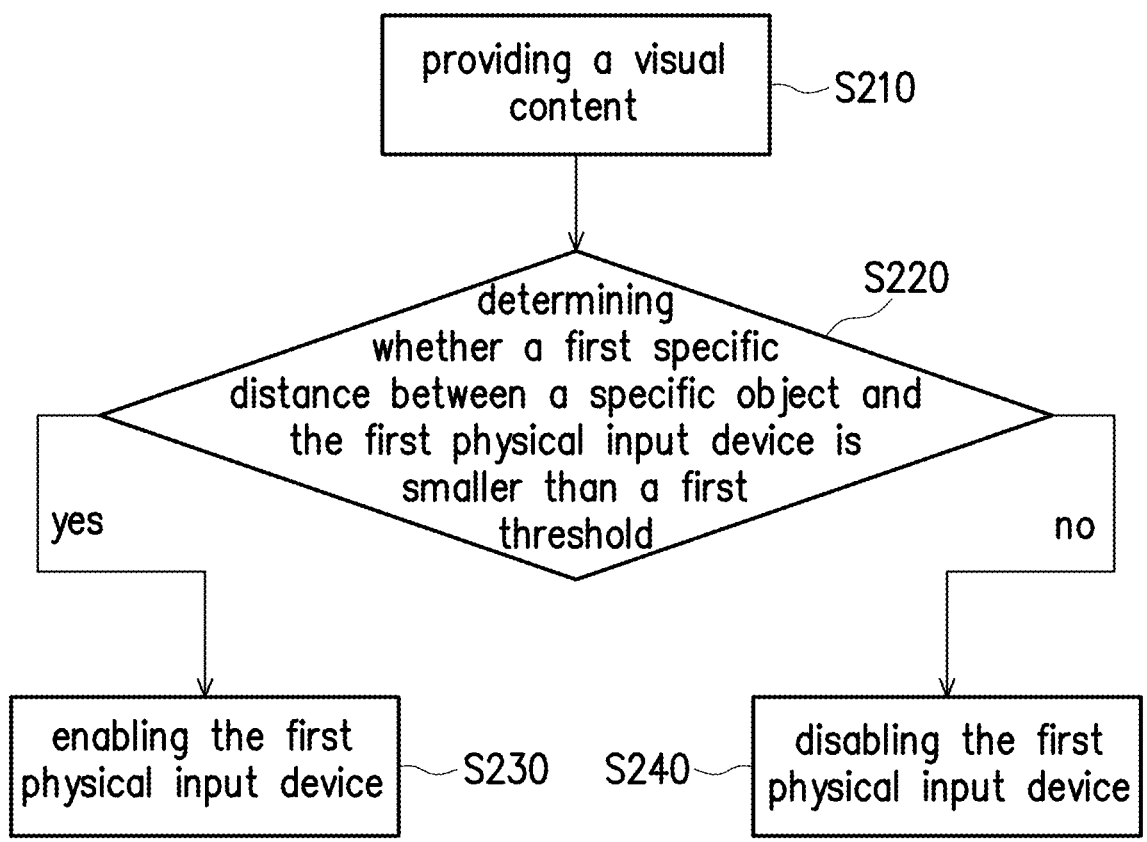
FIG. 2 shows a flow chart of the method for switching input devices according to an embodiment of the disclosure.

See FIG. 2, which shows a flow chart of the method for switching input devices according to an embodiment of the disclosure. The method of this embodiment may be executed by the HMD 100 in FIG. 1, and the details of each step in FIG. 2 will be described below with the components shown in FIG. 1. In addition, for better understanding the concept of the disclosure, FIG. 3A to 3C would be used as examples, wherein FIG. 3A to 3C are application scenarios according to a first embodiment of the disclosure.

Figure 3A:
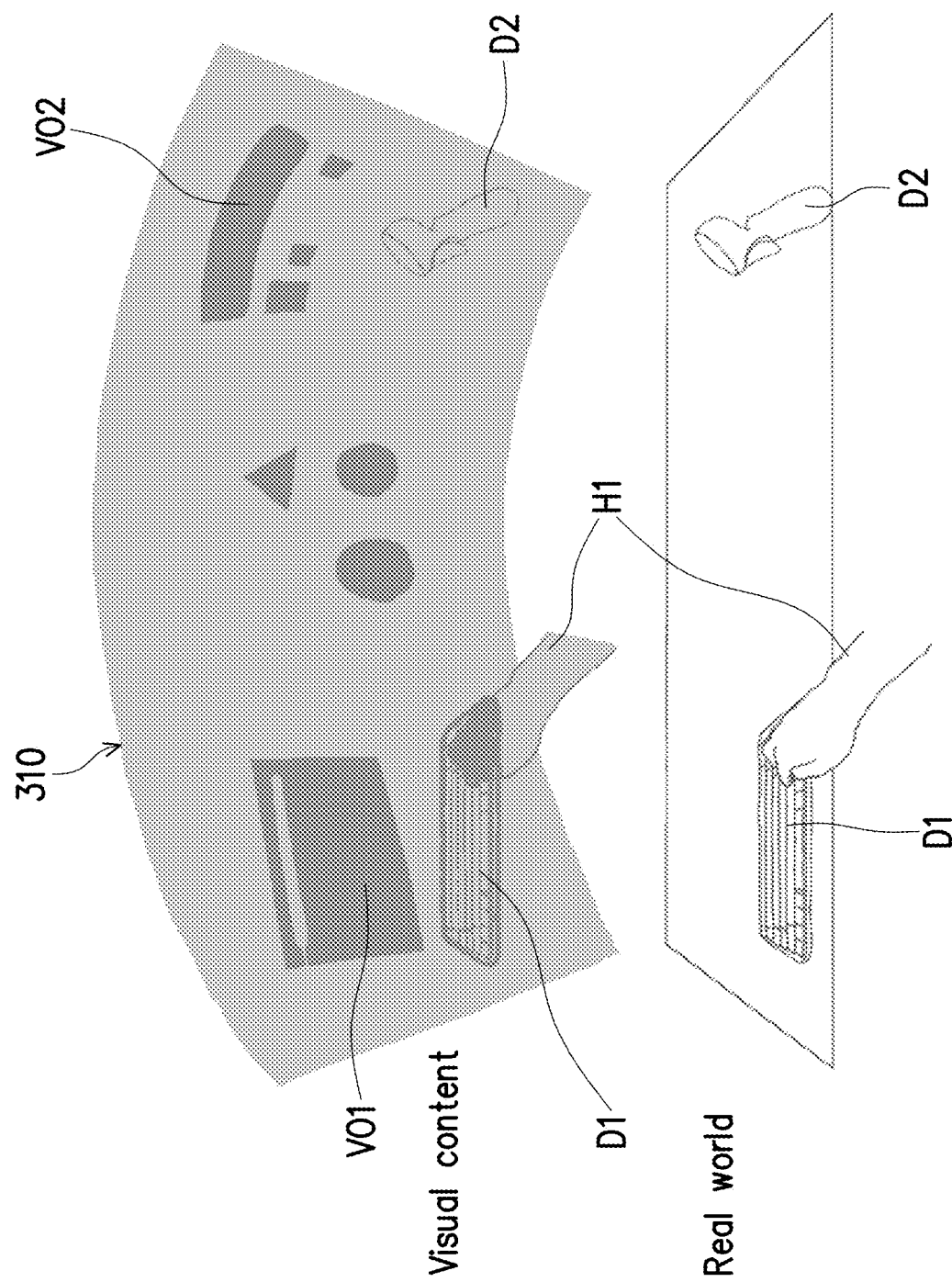
FIG. 3A to 3C are application scenarios according to a first embodiment of the disclosure.
Figure 3B:
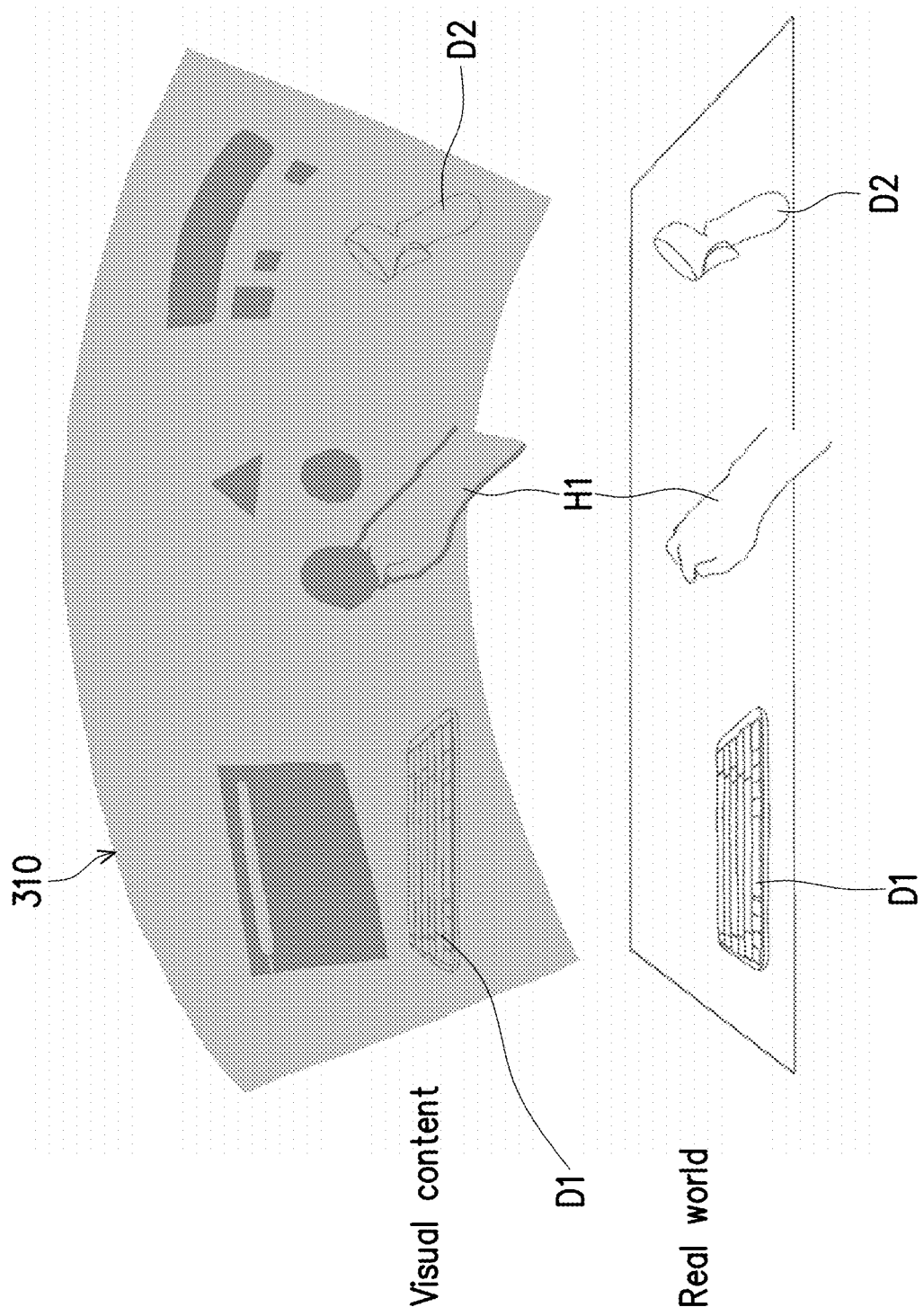
Figure 3C:
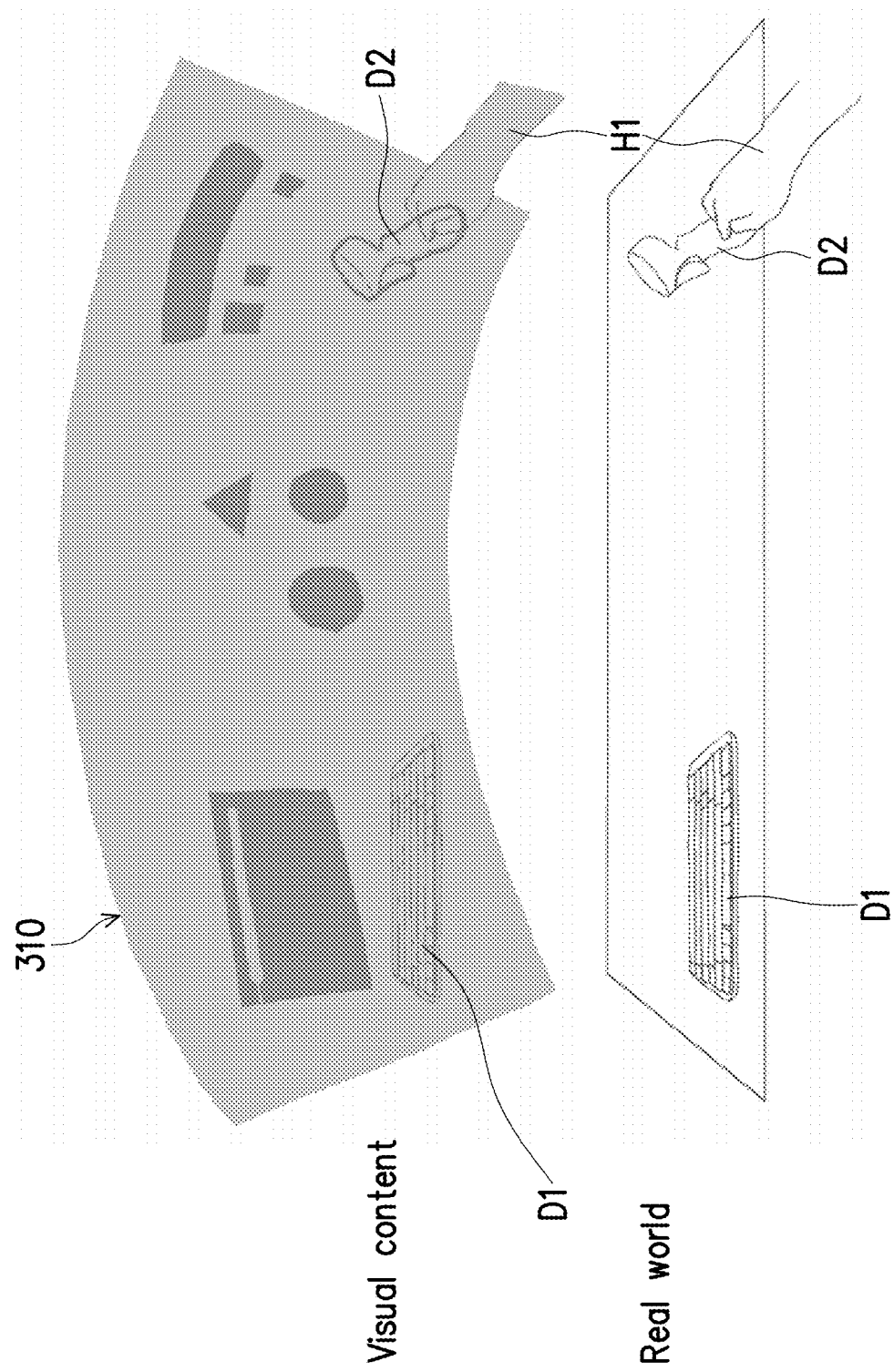

In FIG. 3A, the processor 106 may perform step S210 to control the display 104 to provide a visual content 310. In one embodiment, the visual content 310 may be an MR content that includes virtual objects (e.g., objects VO1 and VO2) and real world objects (e.g., the first physical input device D1, the second physical input device D2, and the hand H1 of the wearer of the HMD 100). That is, the first physical input device D1, the second physical input device D2, and the hand H1 of the wearer of the HMD 100 are visible in the visual content 310.

In the embodiments of the disclosure, the first physical input device D1 (e.g., a keyboard) and the second physical input device D2 (e.g., a controller) may be paired with the HMD 100.

In one embodiment, the wearer of the HMD 100 may use the first physical input device D1 to perform input operations (e.g., typing words) to the HMD 100 when the first physical input device D1 is enabled, and the wearer of the HMD 100 may not use the first physical input device D1 to perform input operations to the HMD 100 when the first physical input device D1 is disabled. Similarly, the wearer of the HMD 100 may use the second physical input device D2 to perform input operations to the HMD 100 when the second physical input device D2 is enabled, and the wearer of the HMD 100 may not use the second physical input device D2 to perform input operations to the HMD 100 when the second physical input device D2 is disabled.

In one embodiment, the wearer of the HMD 100 may use the first physical input device D1 and the second physical input device D2 to perform input operations to the HMD 100 when the first physical input device D1 and the second physical input device D2 are both enabled. On the other hand, the wearer of the HMD 100 may use the hand H1 to perform input operations to the HMD 100 via hand gestures when the first physical input device D1 and the second physical input device D2 are both disabled, but the disclosure is not limited thereto.

Next, in step S220, the processor 106 may determine whether a first specific distance between a specific object and the first physical input device D1 is smaller than a first threshold.

In various embodiments, the processor 106 may use the mechanisms discussed in the following to perform the step S220.

Specifically, in a first embodiment of the disclosure, the specific object may be the hand H1 in FIG. 3A, but the disclosure is not limited thereto. In this case, the processor 106 may obtain a specific 3D object (e.g., a hand-shaped 3D object) corresponding to the specific object (i.e., the hand H1) and a first 3D object (e.g., a keyboard-shaped 3D object) corresponding to the first physical input device D1 via an inside-out tracking mechanism. In various embodiments, the details of the inside-out tracking mechanism may be referred to related conventional documents, and the details thereof would not be repeated herein. Next, the processor 106 may define a first distance between the specific 3D object and the first 3D object as the first specific distance and determine whether the first distance is smaller than the first threshold.

In various embodiments, the first threshold may be designed to be any distance value based on the requirements of the designer, such as 3 cm, 5 cm or any required values.

In a second embodiment of the disclosure, the first physical input device D1 may be disposed with a first proximity sensor connected with the HMD 100. In some embodiments, the first proximity sensor may be a built-in element of the first physical input device D1 or an external dongle connected to the first physical input device D1, but the disclosure is not limited thereto.

In the second embodiment, the processor 106 may use the first proximity sensor to detect a second distance between the first proximity sensor and an approaching object (e.g., the hand H1). Next, the processor 106 may define the second distance as the first specific distance between the specific object and the first physical input device D1 and determine whether the second distance is smaller than the first threshold.

In a third embodiment, the HMD 100 may be connected to a second proximity sensor, wherein the second proximity sensor may be worn on the hand H1 (e.g., the specific object), but the disclosure is not limited thereto.

In this case, the processor 106 may perform an image recognition (e.g., Google Lens™) to the visual content 310 to recognize a specific 2D object (e.g., a hand-shaped 2D object) corresponding to the specific object and a first 2D object (e.g., a keyboard-shaped 2D object) corresponding to the first physical input device D1 in the visual content 310. Next, the processor 106 may determine whether a third distance between the specific 2D object and the first 2D object is smaller than a specific threshold (which may be arbitrarily chosen by the designer). If the third distance between the specific 2D object and the first 2D object is determined to be smaller than the specific threshold, it represents that the specific object may be close to the first physical input device D1. Therefore, the processor 106 may further use the second proximity sensor to detect a fourth distance between the second proximity sensor and an approaching object (e.g., the first physical input device D1). Afterwards, the processor 106 may define the fourth distance as the first specific distance between the specific object and the first physical input device D1 and determine whether the fourth distance is smaller than the first threshold.

In one embodiment, in response to determining that the first specific distance is smaller than the first threshold, the processor 106 may perform step S230 to enable the first physical input device D1. In this case, the wearer of the HMD 100 may use the first physical input device D1 to the HMD 100.

In some embodiments, after enabling the first physical input device D1, the processor 106 may further disable a hand gesture recognition. Therefore, the wearer of the HMD 100 may not be allowed to perform input operations to the HMD 100 with his/her hands (e.g., the hand H1), but the disclosure is not limited thereto.

On the other hand, in response to determining that the first specific distance is not smaller than the first threshold, the processor 106 may perform step S240 to disable the first physical input device D1. In this case, the wearer of the HMD 100 may not use the first physical input device D1 to the HMD 100.

In brief, the processor 106 may determine whether the specific object (e.g., the hand H1) is close enough to the first physical input device D1. In response to determining that the specific object is close enough to the first physical input device D1 (e.g., the first specific distance being smaller than the first threshold), the processor 106 may correspondingly enable the first physical input device D1 for the wearer of the HMD 100 to perform input operations as shown in FIG. 3A.

On the other hand, in response to determining that the specific object is not close to the first physical input device D1 (e.g., the first specific distance being not smaller than the first threshold), the processor 106 may correspondingly disable the first physical input device D1, such that the wearer of the HMD 100 cannot use the first physical input device D1 to perform input operations as shown in FIG. 3B, but the disclosure is not limited thereto.

In other embodiments, the processor 106 may determine whether to enable/disable the second physical input device D2 based on how close is the specific object (e.g., the hand H1) to the second physical input device D2.

Specifically, the processor 106 may be configured to: determine whether a second specific distance between the specific object and the second physical input device D2 is smaller than a second threshold. In response to determining that the second specific distance is smaller than the second threshold, the processor 106 may correspondingly enable the second physical input device for the wearer of the HMD 100 to perform input operations as shown in FIG. 3C. On the other hand, in response to determining that the second specific distance is not smaller than the second threshold, the processor 106 may correspondingly disable the second physical input device D2, such that the wearer cannot used the second physical input device D2 to perform input operations as shown in FIG. 3B. The related details may be referred to the teachings in the above embodiments, which would not be repeated herein.

In some embodiments, if all of the physical input devices paired with the HMD 100 are disabled, the processor 106 may enable the hand gesture recognition, such that the processor 106 may perform the hand gesture recognition to the specific object (e.g., the hand H1). Therefore, the wearer of the HMD 100 would be allowed to perform input operations to the HMD 100 by performing various hand gestures, but the disclosure is not limited thereto.

The disclosure further provides a computer readable storage medium for executing the method for switching input devices. The computer readable storage medium is composed of a plurality of program instructions (for example, a setting program instruction and a deployment program instruction) embodied therein. These program instructions can be loaded into the HMD 100 and executed by the same to execute the method for switching input devices and the functions of the HMD 100 described above.

In summary, the method provided in the disclosure, whether the specific object is close enough to the physical input device paired with the HMD may be determined. In response to determining that the specific object is close enough to the physical input device, the HMD may correspondingly enable the physical input device for the wearer of the HMD to perform input operations through the physical input device.

On the other hand, in response to determining that the specific object is not close to the physical input device, the HMD may correspondingly disable the physical input device, such that the wearer of the HMD cannot use the physical input device to perform input operations. Accordingly, the disclosure has provided a novel, convenient, and intuitive way for the wearer of the HMD to switch input devices.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A method for switching input devices, adapted to a head-mounted display (HMD), comprising:
    providing a visual content, wherein a first physical input device is visible in the visual content;
    determining whether a first specific distance between a specific object and the first physical input device is smaller than a first threshold;
        enabling the first physical input device in response to determining that the first specific distance is smaller than the first threshold;
        disabling the first physical input device in response to determining that the first specific distance is not smaller than the first threshold.

2. The method according to claim 1, wherein the first physical input device is paired with the HMD, and the step of determining whether the first specific distance between the specific object and the first physical input device is smaller than the first threshold comprising:
    obtaining a specific 3D object corresponding to the specific object and a first 3D object corresponding to the first physical input device via an inside-out tracking mechanism;
    defining a first distance between the specific 3D object and the first 3D object as the first specific distance, and determining whether the first distance is smaller than the first threshold.

3. The method according to claim 1, wherein the first physical input device is paired with the HMD and disposed with a first proximity sensor, the HMD is connected with the first proximity sensor, and the step of determining whether the first specific distance between the specific object and the first physical input device is smaller than the first threshold comprising:
    using the first proximity sensor to detect a second distance between the first proximity sensor and an approaching object;
    defining the second distance as the first specific distance between the specific object and the first physical input device, and determining whether the second distance is smaller than the first threshold.

4. The method according to claim 1, wherein the HMD is paired with the first physical input device and connected to a second proximity sensor, and the step of determining whether the first specific distance between the specific object and the first physical input device is smaller than the first threshold comprising:
    performing an image recognition to the visual content to recognize a specific 2D object corresponding to the specific object and a first 2D object corresponding to the first physical input device in the visual content;
    in response to determining that a third distance between the specific 2D object and the first 2D object is smaller than a specific threshold, using the second proximity sensor to detect a fourth distance between the second proximity sensor and an approaching object;

defining the fourth distance as the first specific distance between the specific object and the first physical input device, and determining whether the fourth distance is smaller than the first threshold.

5. The method according to claim 4, wherein the second proximity sensor is worn on the specific object.

6. The method according to claim 1, wherein the HMD is paired with a second physical input device, the second physical input device is visible in the visual content, and the method further comprising:

determining whether a second specific distance between the specific object and the second physical input device is smaller than a second threshold;

enabling the second physical input device in response to determining that the second specific distance is smaller than the second threshold;

disabling the second physical input device in response to determining that the second specific distance is not smaller than the second threshold.

7. The method according to claim 1, wherein the visual content is a Mixed Reality (MR) content.

8. The method according to claim 1, wherein the specific object is a hand, and in response to disabling the first physical input device, the method further comprising:

performing a hand gesture recognition to the specific object.

9. The method according to claim 1, wherein after the step of enabling the first physical input device, the method further comprising:

disabling a hand gesture recognition.

10. A head-mounted display (HMD), comprising:
a display;
a storage circuit, storing a plurality of modules;
a processor, coupled to the display and the storage circuit, accessing the modules to perform following steps:
controlling the display to provide a visual content, wherein a first physical input device is visible in the visual content;
determining whether a first specific distance between a specific object and the first physical input device is smaller than a first threshold;
enabling the first physical input device in response to determining that the first specific distance is smaller than the first threshold;
disabling the first physical input device in response to determining that the first specific distance is not smaller than the first threshold.

11. A non-transitory computer readable storage medium, recording an executable computer program to be loaded by a head-mounted display (HMD) to execute steps of:

providing a visual content, wherein a first physical input device is visible in the visual content;

determining whether a first specific distance between a specific object and the first physical input device is smaller than a first threshold;

enabling the first physical input device in response to determining that the first specific distance is smaller than the first threshold;

disabling the first physical input device in response to determining that the first specific distance is not smaller than the first threshold.

12. The HMD according to claim 10, wherein the specific object is a hand.

13. The HMD according to claim 10, wherein the first physical input device is paired with the HMD, and the processor is configured to:

obtain a specific 3D object corresponding to the specific object and a first 3D object corresponding to the first physical input device via an inside-out tracking mechanism;

define a first distance between the specific 3D object and the first 3D object as the first specific distance, and determining whether the first distance is smaller than the first threshold.

14. The HMD according to claim 10, wherein the first physical input device is paired with the HMD and disposed with a first proximity sensor, the HMD is connected with the first proximity sensor, and the processor is configured to:

use the first proximity sensor to detect a second distance between the first proximity sensor and an approaching object;

define the second distance as the first specific distance between the specific object and the first physical input device, and determining whether the second distance is smaller than the first threshold.

15. The HMD according to claim 10, wherein the HMD is paired with the first physical input device and connected to a second proximity sensor, and the processor is configured to:

perform an image recognition to the visual content to recognize a specific 2D object corresponding to the specific object and a first 2D object corresponding to the first physical input device in the visual content;

in response to determining that a third distance between the specific 2D object and the first 2D object is smaller than a specific threshold, use the second proximity sensor to detect a fourth distance between the second proximity sensor and an approaching object;

define the fourth distance as the first specific distance between the specific object and the first physical input device, and determining whether the fourth distance is smaller than the first threshold.

16. The HMD according to claim 15, wherein the second proximity sensor is worn on the specific object.

17. The HMD according to claim 10, wherein the HMD is paired with a second physical input device, the second physical input device is visible in the visual content, and the processor is further configured to:

determine whether a second specific distance between the specific object and the second physical input device is smaller than a second threshold;

enable the second physical input device in response to determining that the second specific distance is smaller than the second threshold;

disable the second physical input device in response to determining that the second specific distance is not smaller than the second threshold.

18. The HMD according to claim 10, wherein the visual content is a Mixed Reality (MR) content.

19. The HMD according to claim 10, wherein the specific object is a hand, and in response to disabling the first physical input device, the processor is further configured to:
perform a hand gesture recognition to the specific object.

20. The HMD according to claim 10, wherein after enabling the first physical input device, the processor is further configured to disable a hand gesture recognition.

* * * * *